United States Patent [19]

Hubbard et al.

[11] Patent Number: 4,907,013

[45] Date of Patent: Mar. 6, 1990

[54] CIRCUITRY FOR DETECTING MALFUNCTION OF INK JET PRINTHEAD

[75] Inventors: David W. Hubbard, Stamford; Ronald P. Sansone, Weston, both of Conn.

[73] Assignee: Pitney Bowes Inc, Stamford, Conn.

[21] Appl. No.: 299,573

[22] Filed: Jan. 19, 1989

[51] Int. Cl.[4] .......................... G01D 18/00; B41J 3/04

[52] U.S. Cl. ................................ 346/1.1; 346/140 R; 250/222.1

[58] Field of Search .......................... 346/140, 1.1, 75; 250/222.1

[56] References Cited

U.S. PATENT DOCUMENTS

| | | | |
|---|---|---|---|
| 4,328,504 | 5/1982 | Weber | 346/140 X |
| 4,367,480 | 1/1983 | Kotoh | 346/140 |
| 4,485,386 | 11/1984 | Dagna | 346/140 X |
| 4,493,993 | 1/1985 | Kanamuller | 346/140 X |

FOREIGN PATENT DOCUMENTS 92070 7/1981 Japan .

*Primary Examiner*—Joseph W. Hartary
*Attorney, Agent, or Firm*—Peter Vrahotes; David E. Pitchenik; Melvin J. Scolnick

[57] ABSTRACT

A device and method for detecting nozzle malfunction in an ink jet printhead having a predetermined number of nozzles. The printhead is first controlled whereby each of the nozzles is activated once in a manner which is required to print on a print medium a line having a number of ink dots equal to the predetermined number. Then a photodetector detects whether each location on the print medium which opposed one of the nozzles at the time of activation of that one nozzle has an ink dot printed thereat. Each location is photodetected in time sequence by scanning. The photodetector outputs a signal having a first level in response to each photodetected location which has no ink dot thereat and a signal having a second level in response to each photodetected location which has an ink dot thereat. The output of the photodetector is then processed. In accordance with one embodiment, the length of a printed line is effectively measured to determine if it is shorter than an expected length corresponding to a printed line formed by dots equal in number to the number of nozzles. In accordance with another embodiment, a multi-bit word is formed, each bit representing the state of a corresponding nozzle. The word is input to a look-up table to generate a status signal, in response to which further action will be taken.

16 Claims, 4 Drawing Sheets

CIRCUITRY FOR DETECTING MALFUNCTION OF INK JET PRINTHEAD

FIELD OF THE INVENTION

The invention relates to circuitry for detecting malfunctioning nozzles in a multi-nozzle printhead of an ink jet printer. In particular, it relates to such a printhead incorporated in a postage meter.

BACKGROUND OF THE INVENTION

The use of a multi-nozzle ink jet printhead in an ink jet printer is well known in the prior art. Such a printhead has been used to print postage indicia in an electronic postage meter. Generally the nozzles of the printhead are linearly arrayed along a direction which is perpendicular to the direction of movement of the print medium relative to the printhead. Whether the nozzle array is vertical or at an oblique angle, each nozzle prints a row of dots in the course of printing the postage indicia in a postage meter.

A problem associated with the use of any multi-nozzle ink jet printhead is that it is possible for a nozzle to malfunction so that it becomes unable to eject ink in response to activation. For every nozzle that is unable to eject ink in response to activation, there will be a corresponding row on the print medium which is blank, i.e., has no dots.

This problem is particularly serious in the case of an ink jet printhead incorporated in a postage meter. It is possible that the failure to print one row of dots in the plurality of rows making up the postage indicia will render the postage indicia or some portion thereof indecipherable. In particular, it is possible that the printed postage amount will be indecipherable, causing the postal authorities to refuse to deliver the piece of mail on which the postage indicia have been printed. This is particularly true in the case of numerals which are printed with a stroke of consecutive dots in a row, such as numerals 2, 4, 5, and 7. Such defectively printed postage indicia will result in a monetary loss to the postage meter user since in the conventional secure postage meter, it is impossible to print postage indicia unless the postage amount being indicated has been accounted for within the postage meter. Since the postage meter user must account to the postal authorities for all postage printed, the meter user will also end up paying for any printed postage amount even if the postage indicia representing that amount was indecipherable, rendering the piece of mail undeliverable.

SUMMARY OF THE INVENTION

It is an object of the invention to overcome the foregoing problem by providing means for detecting whether any of the nozzles of the ink jet printhead have failed.

It is a further object of the invention to provide an ink jet printer in which the failed nozzles are detected prior to printing of the indicia representing the postage amount.

In particular, it is an object of the invention to shutdown the postage meter if the failed nozzles detected are such that sufficiently decipherable indicia representing the postage amount cannot be printed.

Also it is an object of the invention to recognize conditions wherein the failure of a particular nozzle can be compensated for to ensure that sufficiently decipherable indicia representing the postage amount can be printed.

It is a further object of the invention to provide simple and inexpensive circuitry for detecting whether any of the nozzles of the ink jet printhead have failed and whether that failure is fatal to proper operation of the postage meter.

The foregoing objects of the invention are achieved in accordance with the preferred embodiments by providing means for photodetecting whether a dot has been printed on the medium in response to activation of each nozzle of the printhead. Each nozzle is fired only once and in accordance with a program such that a line of dots spaced at regular intervals will be formed if all the nozzles are functioning properly. This can occur either at the start of printing of the postage indicia, in which case the line forms part of the postage indicia, or prior to the start of printing of the postage indicia, in which case the line forms part of a test pattern. The photodetection circuitry produces one signal in response to detection of an ink dot and another signal in response to detection of the absence of an ink dot.

In accordance with one preferred embodiment of the invention, the photodetector output is encoded into a signal having a high level when the absence of an ink dot has been detected and a low level when the presence of an ink dot has been detected. Therefore the encoded signal undergoes a transition from the high level to the low level when the start of the line of printed dots is detected. If the line has a discontinuity due to the failure of a nozzle to eject ink, then the encoded signal will undergo a transition from the low level to the high level when the start of the discontinuity dots is detected. Thereafter the encoded signal will again undergo a transition from the high level to the low level when the end of the discontinuity dots is detected. These transition will be repeated for each detected discontinuity in the line of dots. At the end of the line, the encoded signal will again undergo a transition from the low level to the high level.

In accordance with this first embodiment, only the presence of a discontinuity in the line is detected, i.e., which nozzle has failed is not determined. In response to detection of the discontinuity indicating a failed nozzle, the postage meter is disabled.

In accordance with another preferred embodiment of the invention, the photodetector output is encoded to produce a train of bits of binary data. The binary "one" represents the absence of an ink dot and the binary "zero" represents the presence of an ink dot. (Obviously this scheme can be reversed by incorporation of an inverter. The train of binary data has a number of bits equal to the number of nozzles in the printhead. For example, if the printhead has 32 nozzles, then a 32-bit work will be formed, each bit corresponding to one of the nozzles, each binary "one" representing a properly functioning nozzle and each binary "zero" representing a failed nozzle.

In accordance with this second embodiment, the 32-bit word forms the address for a look-up table. The look-up table stores a code representing a command for action to be taken in dependence on the identity of any failed nozzles. If no nozzles have failed, then the look-up table output will be a control signal causing the remainder of the postage indicia to be printed. If one or more nozzles have failed in a manner that can be compensated for by reprogramming of the manner in which the nozzles are fired, then the look-up table output will be a control signal causing the central processor to carry out such reprogramming, after which the remainder of the postage indicia will be printed. If one or more nozzles have failed in a manner that cannot be compensated for by reprogramming of the steps by which the nozzles are fired, then the look-up table output will be a control signal causing the central processor to disable the postage meter, thereby preventing the printing of a postage amount which is not sufficiently decipherable.

BRIEF DESCRIPTION OF THE DRAWINGS

The preferred embodiments of the invention will be described in detail hereinafter with reference to the attached drawings, wherein.

DETAILED DESCRIPTION OF THE PREFERRED EMBODIMENTS

Figure 1:
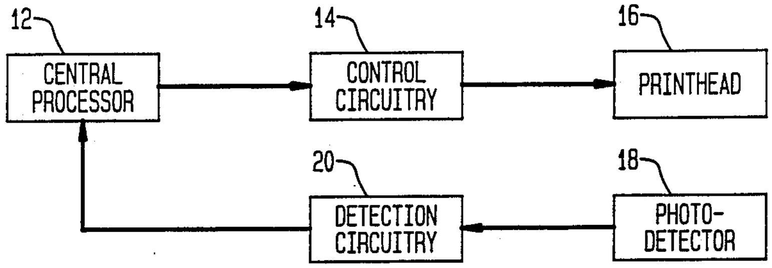
FIG. 1 is a block diagram showing the main units of the preferred embodiments of the invention.

The basic components of the preferred embodiments of the invention are generally depicted in FIG. 1. In particular, these components are incorporated in a postage meter, although the teaching of the invention is applicable to any device which incorporates an ink jet printhead.

The central processor 12 supplies binary data representing the characters and/or graphics to be printed and binary data representing the addresses in a bit map memory incorporated in control circuitry 14 at which the respective bits of data are to be stored. The control circuitry 14 controls the firing of the nozzles of printhead 16 in dependence on the data stored in the bit map memory. The control circuitry 14 is in turn controlled by central processor 12 in accordance with various subroutines stored in the internal memory of the central processor.

In particular, the central processor is programmed to cause the printhead to print a line of dots for testing the nozzles for malfunctions. This line of dots can be printed either as a separate test pattern prior to the start of printing the postage indicia or at the start of printing the postage indicia as part thereof. In the preferred embodiments disclosed herein, the test line is slanted. However, the test line could also be vertical if vertically displaceable photodetection means are provided.

In accordance with the invention, the test line of dots is photodetected by photodetector 18, which generates a voltage proportional to the amount of light impinging on its photosensitive surface. More specifically, photodetector generates a signal having a voltage above a certain threshold when the photodetector detects the absence of dots and a signal having a voltage below that certain threshold when the photodetector detects the presence of a dot. These analog signals are input to detection circuitry 20, which converts them to digital form and then decodes the digital signals to determine the state of the printhead, i.e., whether any nozzles of the printhead have failed. In accordance with one embodiment of the invention, the detection circuitry also outputs specific status signals to the central processor in dependence on which of the nozzles have failed. In response to these status signals, central processor 12 takes appropriate action.

The preferred embodiments of the invention incorporate a multi-nozzle ink jet printhead in which the nozzles are arranged along a line which is canted or tilted to lie at a small angle relative to the direction of motion of the medium. Thus, the vertical spacing between nozzles will become equal to the arithmetic product of the sine of the angle between the direction of nozzle alignment and the direction of motion of the medium multiplied by the nozzle spacing.

In the preferred embodiment of the invention, the one application of this printer, the angle between the direction of nozzle alignment and the direction of motion of the medium is 16 degrees, yielding a vertical resolution of about 120 dots per inch, i.e. a spacing between rows of dots of 0.0083 inch.

Figure 2:
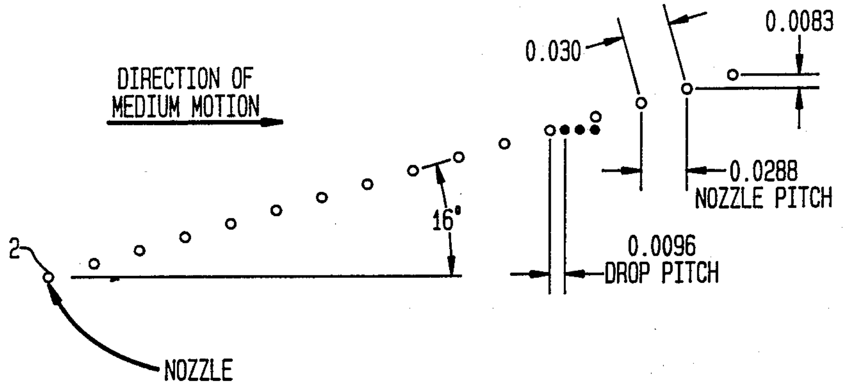
FIG. 2 is a diagram showing in part the arrangement of the nozzles of the printhead relative to the direction of movement of the print medium in accordance with the preferred embodiments of the invention.

The arrangement of the nozzles 2 in accordance with the preferred embodiment of the invention is partially shown in FIG. 2. It should be understood that the multinozzle printhead in accordance with the preferred embodiments of the invention has 32 nozzles in linear alignment, although FIG. 1 shows less than 32 nozzles in order to simplify the drawing while still depicting the geometric principle involved.

In accordance with the preferred embodiments of the invention shown in FIG. 2, the horizontal spacing between nozzles will be approximately 0.0288 inch. The horizontal spacing between dots has been selected as one-third of this horizontal nozzle spacing, i.e., 0.0096 inch, defining the horizontal dot resolution as about 104 dots per inch. The "pitch" of the printhead is defined here as the ratio of the horizontal nozzle spacing to the distance between dot columns. The pitch in accordance with the preferred embodiment of the invention has an integral value of 3.

It would be readily understood by the practitioner of ordinary skill in the art of ink jet printers that the principle of the invention can be applied using a printhead having a number of nozzles different than 32 and having an angle between the direction of nozzle alignment and the direction of motion of the medium which is different than 16 degrees. In particular, the angle between the direction of nozzle alignment and the direction of motion of the medium could be 90 degrees.

A shaft encoder (not shown) attached to the medium transport mechanism generates a pulse each time the multi-nozzle printhead is displaced a distance equal to the spacing between dot columns. Thus, the shaft encoder generates three pulses during a displacement of the multi-nozzle printhead equal to the horizontal spacing between nozzles.

Figure 3:
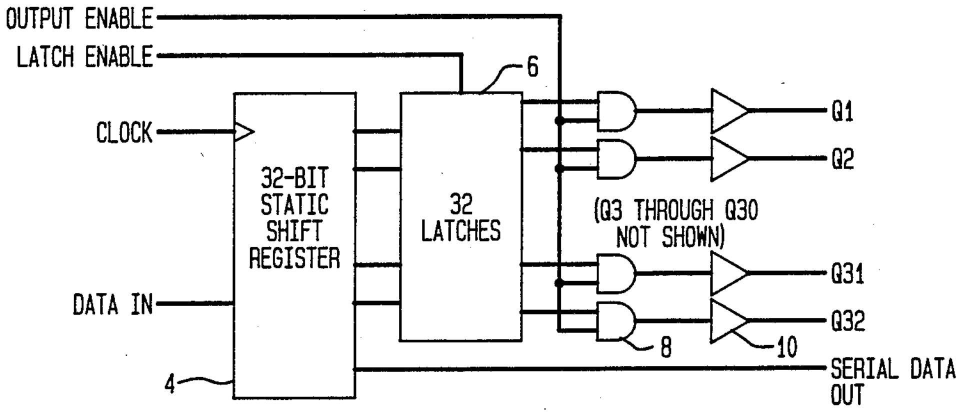
FIG. 3 is a logic diagram of the circuitry for exciting the printhead in accordance with the preferred embodiments of the invention.

The excitation of the multi-nozzle printhead is accomplished using a Siliconix SI9554 integrated circuit. A logic diagram for this integrated circuit is shown in FIG. 3. Alternatively, any other functionally equivalent circuitry could be used in place of the Siliconix SI9554.

In accordance with the preferred embodiment of the invention, 32 bits of control data are shifted into a 32-bit shift register 4. Subsequently, this data is transferred to a 32-bit latch register 6. Each bit of control data controls whether a corresponding nozzle 2 of the printhead is turned on or off, i.e., ejects or does not eject ink, during the print cycle corresponding to those 32 bits of control data. When the medium reaches the next dot position, the pulse from the shaft encoder enables an output enable pulse which enables 32 AND gates 8, which in turn causes the latched 32 data bits to be respectively passed through AND gates 8, amplified by amplifiers 10 and output on the 32 output terminals of the integrated circuit. Piezoelectric actuators (not shown) energize selected ones of the 32 nozzles on the printhead, causing ink drops to be ejected onto the medium at the desired locations, in dependence on the binary value of the respective 32 bits of control data.

Figure 4:
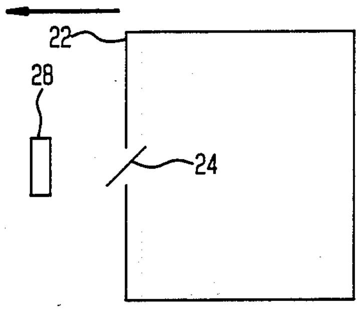
FIG. 4 is a diagram showing the relationship between the slanted line printed as part of the postage indicia at the beginning thereof and the slit through the dots of ink are photodetected in accordance with the preferred embodiments of the invention.

The slanted line which is printed in accordance with the preferred embodiments of the invention is depicted in FIG. 4. The arrow in FIG. 4 denotes the direction of movement of the print medium. However, at the outset it should be noted that the invention is also applicable in the case where the printhead, not the medium, is moved.

In accordance with the preferred embodiments, only the variable data in the postage indicia is printed by the ink jet printhead. The remainder of the postage indicia 22 is printed separately using a conventional print roller. At the start of printing the variable postage data a slanted line 24 is printed. In particular, the slanted line is formed by activating each of the 32 nozzles only once. Since the nozzles are spaced at a distance equal to three dot columns and the dots of the slanted line are to be formed in adjacent dot columns, the nozzles will be fired in timed sequence, adjacent nozzles being fired at a time interval equal to the time required for the printhead to move two dot columns. It should be noted, however, that different printhead configurations will require that the nozzles be fired in accordance with a different scheme. The invention is not limited to any particular configuration or number of nozzles as long as the printhead can be controlled to print a line of dots by firing each nozzle only once.

The slanted line is scanned by a slit 28 having a width such that it receives light reflected from an area of blank medium having a width substantially equal to the diameter of an ink drop ejected by a nozzle. Thus during the scanning of the slanted line, the slit will pass through 32 successive positions corresponding to the 32 dots printed by the 32 nozzles if none of the nozzles have failed.

Figure 5:
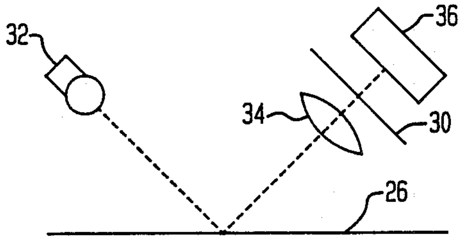
FIG. 5 is a diagram showing the main components of the photodetection system in accordance with the preferred embodiments of the invention.

The main components of the photodetection subsystem are depicted in FIG. 5. A light beam is projected by light source 32 onto the surface of the print medium 26. A lens 34 is arranged in the path of the light reflected from the medium surface. Lens 34 refocuses the beam to compensate for any divergence caused by the reflection. An opaque mask 30 is arranged on the far side of the lens 34. Mask 30 has the slit 28 formed therein. Slit 28 has dimensions such that it substantially passes only light reflected from a vertical section of the dot column located at the point of reflection of the light beam. The light passing through slit 28 thereafter impinges on the photosensitive surface of a photodetector 36. As previously noted, the photodetector generates a voltage proportional to the amount of light impinging on its photosensitive surface. The amount of light impinging on the photosensitive surface varies in dependence on whether or not an ink dot has been printed in the vertical section of the dot column being scanned by the slit. The signal output by the photodetector therefore carries information regarding the presence or absence of an ink dot in each of the scanned dot columns.

In the event that all nozzles have ejected ink in response to activation, the slanted line will comprise 32 dots without a discontinuity. Correspondingly, the photodetector output will undergo a transition from the high level to the low level when the dot column having the first dot of the slanted line located therein is scanned. The photodetector output will remain at the low level during scanning of the next 31 dot columns. Then the photodetector output will undergo a transition from the low level to the high level when the dot column following the dot column having the last dot of the slanted line located therein is scanned. A low level signal at the photodetector output for a time period equal to the time to scan 32 dot columns indicates the all nozzles have fired properly.

Figure 7:
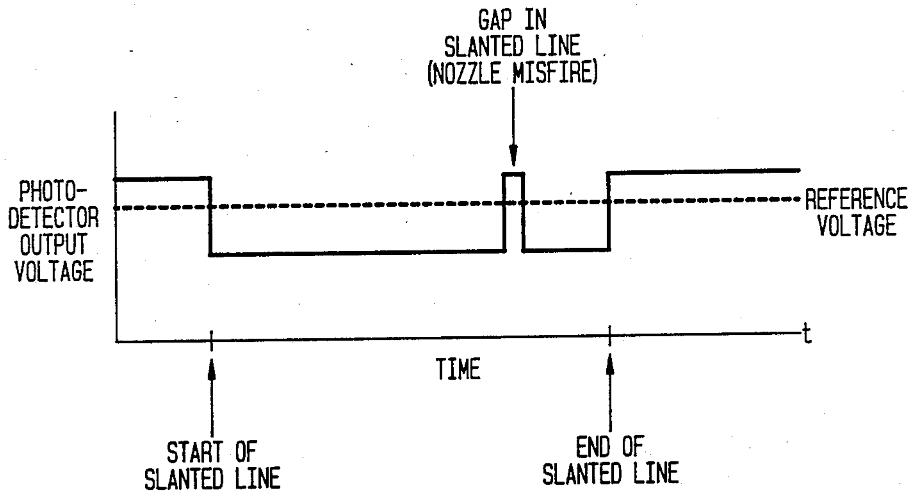
FIG. 7 is a timing diagram showing the photodetector output voltage during detection of a line printed by a printhead have one failed nozzle.

FIG. 7 depicts the case wherein one nozzle in the 32-nozzle array has failed to eject ink in response to activation during printing of the slanted line. Because one nozzle has failed to fire, there will be a discontinuity in the slanted line, i.e. the vertical section of the dot column being scanned will be substantially blank, causing the photodetector output to return to a high level. As the slit scans to the next dot column, the photodetector output will again drop to the low level, indicating the discontinuity in the slanted line has passed. Thus a malfunctioning nozzle can be detected by a sequence in which the voltage rises and then falls at an interval equal to the time required for the slit to scan one dot columns. If the interval between the rise and fall equals the time to scan two dot columns, then this indicates that a pair of adjacent nozzles have malfunctioned and so forth.

In two instances, however, a malfunctioning nozzle will not cause a rise followed immediately by a fall in the photodetector output voltage, i.e., when an end nozzle has failed to fire. In both of these instances, the photodetector output will be a low level signal having a duration equal to the time it takes to scan 31 dot columns. Because the photodetector output is the same in both cases, i.e., ambiguous, which nozzle has malfunctioned cannot be determined from scanning of the slanted line alone.

One solution to this ambiguity is to print a second slanted line by firing all of the nozzles except for one of the end nozzles. This second slanted line is then detected to determine which end nozzle malfunctioned. If the photodetector output is low for a duration equal to the time it takes to scan 31 dot columns, then it is apparent that the end nozzle which was not activated during printing of the second slanted line is the defective nozzle. Conversely, if the photodetector output is low for a duration equal to the time it takes to scan 30 dot columns, then it is apparent that the end nozzle which was activated during printing of the second slanted line is the defective nozzle.

Other schemes for resolving the aforementioned ambiguity will be readily apparent to the practitioner of ordinary skill in the art of photodetection.

Figure 6:
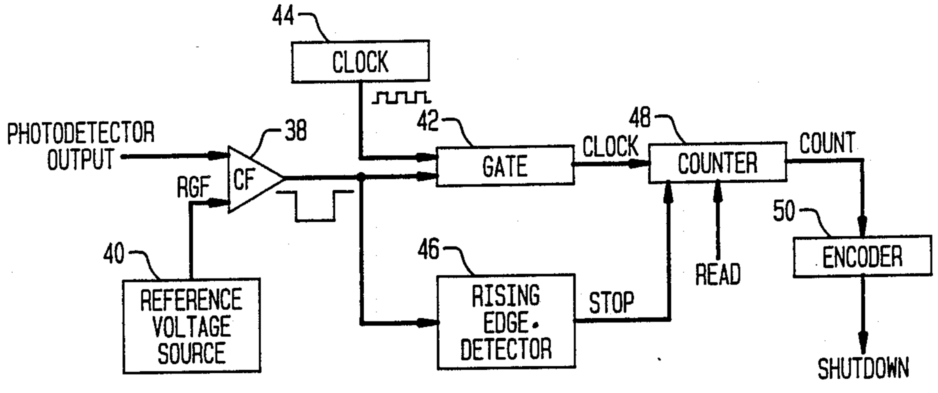
FIG. 6 is a block diagram showing the main logic components of the nozzle malfunction detection circuitry in accordance with the first preferred embodiment of the invention.

A block diagram of the circuitry in accordance with the first preferred embodiment of the invention is shown in FIG. 6. The photodetector output voltage is applied to one input of a comparator 38, the other input of which receives a reference voltage level from reference voltage source 40. The comparator 38 outputs a binary signal having a high level (hereinafter referred to as "one") when the photodetector output voltage is greater than the reference voltage and a binary signal having a low level (hereinafter referred to as "zero") when the photodetector output voltage is less than the reference voltage.

The output of comparator 38 is connected to an input of gate 42. The other input of gate 42 is connected to the output of a clock 44. The clock 44 outputs a CLOCK signal which has a period substantially equal to the time required for the slit 28 to scan a distance equal to the width of one dot column.

When the comparator output is "zero", gate 42 is enabled. When gate 42 is enabled, it passes the CLOCK signal output by clock 44 substantially unchanged. This CLOCK signal is received by a counter 48 which counts up one unit for each clock pulse received. Because the counter begins to count when the first dot of the slanted line is detected, it effectively counts in real time the number of dot columns containing a dot which have been scanned.

The output of comparator 38 is also connected to the input of a rising edge detector 46. The rising edge detector 46 outputs a STOP signal to counter 48 in response to a transition from "zero" to "one" on the comparator output. This transition corresponds to either a discontinuity in the slanted line or the end of the slanted line, depending on the value in counter 48 when the count is stopped. In response to a READ signal from the central processor, the count is output to an encoder 50, which issues a SHUTDOWN signal if the count does not equal 32. A count less than 32 indicates that less than all of the 32 nozzles were properly fired in response to activation. In response to the SHUTDOWN signal, the central processor disables the postage meter.

The specific logic circuitry making up the components generally depicted in FIG. 6 are readily apparent to a practitioner of ordinary skill in the art of digital circuitry design.

Figure 8:
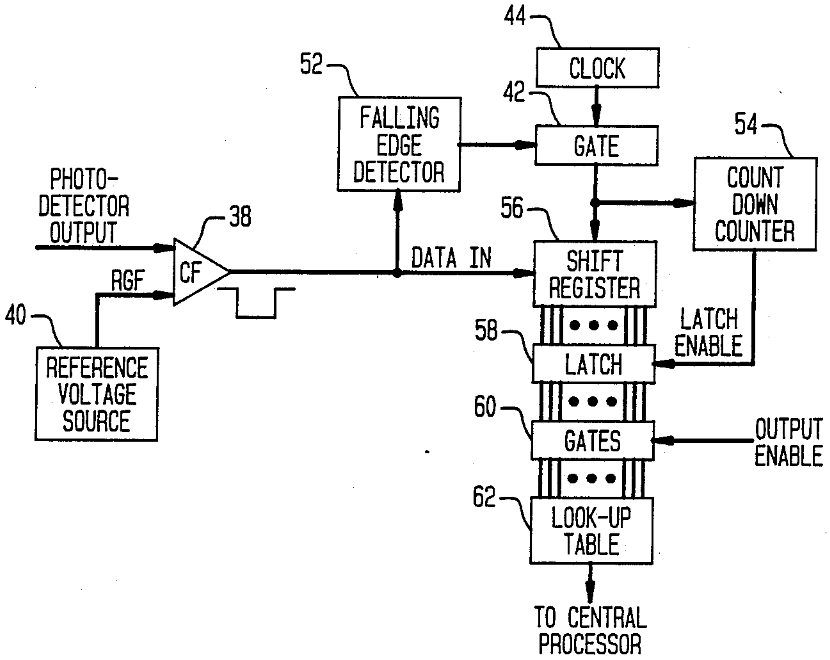
FIG. 8 is a block diagram showing the main logic components of the nozzle malfunction detection circuitry in accordance with the second preferred embodiment of the invention.

A block diagram of the circuitry in accordance with the second preferred embodiment of the invention is shown in FIG. 8. The photodetector output voltage is again applied to one input of a comparator 38, the other input of which receives a reference voltage level from reference voltage source 40. The comparator 38 outputs a "one" when the photodetector output voltage is greater than the reference voltage and a "zero" when the photodetector output voltage is less than the reference voltage.

The output of comparator 38 is connected to the data input of a 32-bit shift register 56. The output of comparator 38 is also connected to the input of a falling edge detector 52. In response to a transition from "one" to "zero" on the comparator output, the falling edge detector 52 outputs a signal to one input of gate 42 which enables gate 42. This transition corresponds to detection of the start of the slanted line. The other input of gate 42 is connected to the output of clock 44. Clock 44 again outputs a CLOCK signal which has a period substantially equal to the time required for the slit 28 to scan a distance equal to the width of one dot column.

When gate 42 is enabled, it passes the CLOCK signal output by clock 44 substantially unchanged. This CLOCK signal is received by the shift register 56, which shifts the incoming data by one bit in response to each clock pulse received.

The CLOCK signal is also received by a count down counter 54, which begins to count down from 31 in response to the transition of the comparator output from "one" to "zero". When the count down counter reaches a value of zero after 32 clock pulses, it outputs a LATCH ENABLE signal to latch 58. During this countdown, the shift register 56 has successively shifted the incoming data until 32 bits of data are held therein. In response to the LATCH ENABLE signal, the 32 bits of data held by the shift register are output in parallel to latch 58.

The latched data is in turn output to a look-up table 62 via gates 60 in response to an OUTPUT ENABLE signal from the central processor. The look-up table need not be incorporated in the detection circuitry 20 and could equally effectively be incorporated in the central processor itself. In accordance with the second preferred embodiment, the look-up table is stored in a read only memory (ROM). The data is input to the address pins of the ROM. The look-up table stores the different possible states of the multi-nozzle printhead and outputs the state addressed by the input data. This output represents the status of the multi-nozzle printhead based on the test conducted.

In particular, if the 32 bits received by the shift register during its enablement are all "zero", this indicates that all of the 32 nozzles were properly fired in response to activation. If the 32 bits received by the shift register during its enablement are not all "zero", this indicates that all of the 32 nozzles were not properly fired in response to activation. In fact, each "one" in the 32-bit word output from shift register 56 represents a malfunctioning nozzle. Depending on the data input to the look-up table, a corresponding status signal will be output. The subsequent steps to be performed depend on the state of the multi-nozzle printhead which is read from the look-up table.

Figure 9:
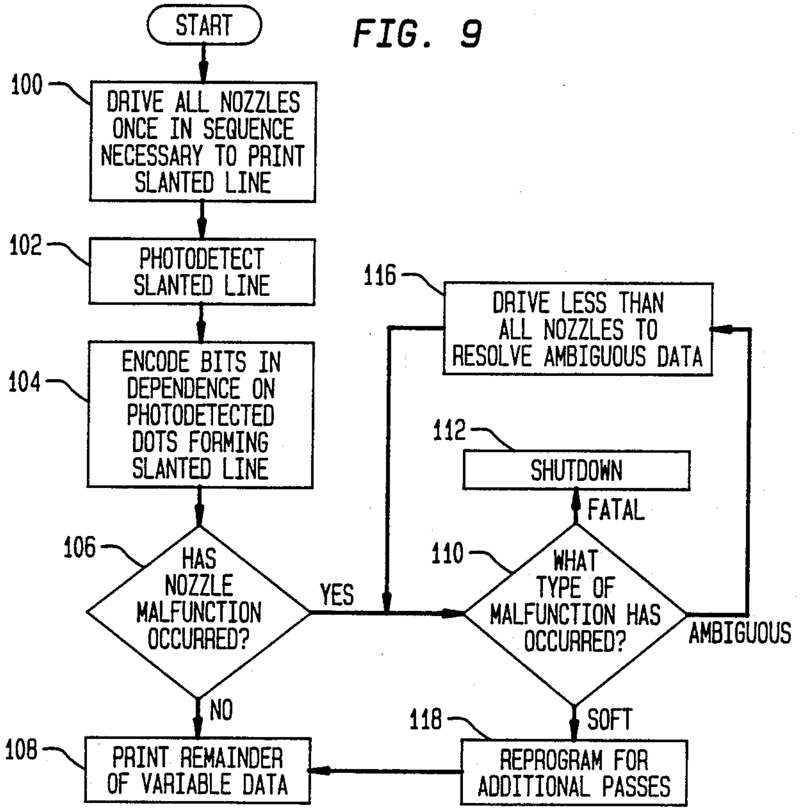
FIG. 9 is a flowchart showing the steps to be carried out in accordance with the second preferred embodiment of the invention.

FIG. 9 shows the various steps which are taken in accordance with the second preferred embodiment of the invention. As already explained, in step 100 all nozzles are driven once in the sequence necessary to print a slanted line wherein the number of ink dots making up the line equals the number of nozzles in the printhead. The slanted line is photodetected in step 102. The data representing the state of the nozzles is acquired starting with the first transition of the comparator output from "one" to "zero". Upon the start of data acquisition, a 32-bit word is formed (step 104) representing the presence or absence of ink dots in the variable data vertical section of the corresponding 32 dot columns. This 32-bit word is decoded to determine whether a nozzle malfunction has occurred (step 106). If no malfunction has occurred, then the remainder of the variable data, including the postage amount, is printed by the ink jet printhead (step 108). If a nozzle malfunction has occurred, then the type of malfunction is identified (step 110).

If the number or location of the malfunctioning nozzles is such that the central processor is unable to compensate by stepping the printhead in the vertical direction and activating selected nozzles during a predetermined number (preferably one) of additional passes over the print medium, then this condition is treated as a fatal error. The number of passes which can be made is, of course, limited by the number of different vertical positions at which the printhead can be located. In response to a fatal error, the postage meter is disabled (step 112).

On the other hand, if the number or location of the malfunctioning nozzles is such that the central processor is able to compensate by stepping the printhead in the vertical direction and activating selected nozzles during a predetermined number (preferably one) of passes over the print medium, then this condition is treated as a soft error. In response to a soft error, the central processor reprograms the control circuitry to retrieve the unprinted data from the bit map memory and supply the retrieved data to properly functioning nozzles (step 118). The missing rows of data are then printed during the additional passes (step 108).

Finally, as already discussed in connection with FIG. 7, if the data is ambiguous, a second slanted line is printed using fewer nozzles and the photodetection is repeated, except that in this mode the data is input to an auxiliary look-up table (not shown in (FIG. 8).

The specific logic circuitry making up the components generally depicted in FIG. 8 are readily apparent to a practitioner of ordinary skill in the art of digital circuitry design.

Furthermore, it is to be understood that the foregoing preferred embodiments are disclosed for illustrative purposes. The scope of the invention is defined in the appended claims.

What is claimed is:

1. A device for detecting nozzle malfunction in an ink jet printhead having a predetermined number of nozzles, comprising:

means for controlling said printhead whereby each of said nozzles is activated once in a manner which is required to print on a print medium a line having a number of ink dots equal to said predetermined number;

means for detecting that one of said nozzles has failed to print an ink dot in response to its activation;

means for photodetecting whether each location on said print medium which opposes one of said nozzles at the time of activation of said one of said nozzles has an ink dot printed thereat, each of said locations being photodetected in time sequence by scanning, said photodetecting means outputting a signal having a first level in response to each photodetected location which has no ink dot thereat and a signal having a second level different than said first level in response to each photodetected location which has as ink dot thereat; and means for processing the output of said photodetecting means, said processing means generating a signal which blocks printing by said printhead in response to a transition from said signal of said second level to said signal of said first level in the output of said photodetecting means during a predetermined window of time corresponding to the time required to scan a line having said predetermined number of ink dots;

said processing means having a reference voltage source, a comparator having inputs respectively coupled to said reference voltage source and to said photodetecting means, means for measuring the time interval from a transition from said signal of said first level to said signal of said second level to said transition from said signal of said second level to said signal of said first level in the output of said photodetecting means, and means for outputting a shutdown signal in response to said time interval being less than said window of time.

2. The device as defined in claim 1, wherein said photodetecting means comprises a light source directed at said print medium, a photodetector arranged to detect light reflected from said print medium and an opaque mask arranged in the path of said reflected light, said mask having a slit.

3. The device as defined in claim 1, wherein said measuring means comprises clocking means for generating a clocking signal, gating means coupled to receive signals from said clocking means and said comparator, rising edge detector means for detecting a transition in the output of said comparator corresponding to said transition from said signal of said second level to said signal of said first level in the output of said photodetecting means, and counting means coupled to said gating means and said rising edge detector means for counting in response to said clocking signal until said transition in the output of said comparator.

4. The device as defined in claim 1, wherein said detecting means comprises:

means for photodetecting whether each location on said print medium which opposed one of said nozzles at the time of activation of said one of said nozzles has an ink dot printed thereat, each of said locations being photodetected in time sequence by scanning, said photodetecting means outputting a signal having a first level in response to each photodetected location which has no ink dot thereat and a signal having a second level different than said first level in response to each photodetected location which has an ink dot thereat;

means for encoding the output of said photodetecting means, said encoding means generating a multi-bit word corresponding to the state of said printhead, said multi-bit word having a bit of first level corresponding to each photodetected location which caused a signal of said first level to be produced and having a bit of second level corresponding to each photodetected location which caused a signal of said second level to be produced; and means for generating a status signal in dependence on said multi-bit word.

5. The device as defined in claim 4, wherein said photodetecting means comprises a light source directed at said print medium, a photodetector arranged to detect light reflected from said print medium and an opaque mask arranged in the path of said reflected light, said mask having a slit.

6. The device as defined in claim 4, wherein said encoding means comprises a reference voltage source and a comparator having inputs respectively coupled to said reference voltage source and to said photodetecting means, and said means for generating a status signal comprises means for storing said multi-bit word, look-up table means for outputting an addressed one of a plurality of stored status signals in response to a signal received at a plurality of address terminals, and means for enabling the transmission of a signal representing said multi-bit word from said storing means to said address terminals of said look-up table means.

7. The device as defined in claim 6, wherein said storing means comprises shift register means coupled to receive said multi-bit word from said comparator and latching means coupled to said shifting means, and said means for generating a status signal further comprises a falling edge detector means for detecting a transition in the output of said comparator corresponding to a transition from said signal of said first level to said signal of said second level in the output of said photodetecting means, clocking means for generating a clocking signal, gating means coupled to receive signals from said clocking means and said falling edge detector means and to pass said clocking signals to said shift register means when enabled by a signal from said falling edge detector means, and count down counting means coupled to count down in response to said clocking signals by way of said gating means and to output a latch enable signal to said latching means in response to completion of said countdown.

8. The device as defined in claim 7, wherein enabling means comprises gating means for coupling said latching means to said address terminals of said look-up table means.

9. A method for determining whether any nozzles of a multinozzle ink jet printhead do not eject ink onto a print medium in response to activation, comprising the following steps:

(a) activating each nozzle of said multinozzle ink jet printhead once in accordance with a first predetermined routine for printing on said medium a line formed by a number of dots equal to the number of nozzles in said printhead;

(b) photodetecting a plurality of areas on said medium in sequence, each photodetected one of said plurality of areas including a respective area opposing a corresponding nozzle at the time when said corresponding nozzle was activated;

(c) outputting a signal having a first characteristic in response to each photodetected one of said plurality of areas which has an ink dot formed thereon and a signal having a second characteristic in response to each photodetected one of said plurality of areas which does not have an ink dot formed thereon;

(d) encoding said signals to form a multibit word having a bit of a first level corresponding to each signal of said first characteristic and having a bit of a second level corresponding to each signal of said second characteristic; and (e) decoding said multibit work to determine which if any of said nozzles has not ejected ink in response to activation.

10. The method as defined in claim 9, further comprising the step of blocking further printing by said printhead in response to the output of a first signal having said second characteristic.

11. The method as defined in claim 9, further comprising the steps of:

(f) blocking further printing by said printhead in response to said word having one of a first plurality of states; and (g) selecting one of a plurality of programs for printing indicia using less than all of said nozzles in response to said word having one of a second plurality of states.

12. The method as defined in claim 11, further comprising the steps of:

(h) activating less than all of said nozzles once in accordance with a second predetermined routine for printing on said medium a line formed by a number of dots equal to less than the number of nozzles in said printhead and then repeating steps (b) and (c) in response to said word having one of a third plurality of states.

13. The method as defined in claim 12, further comprising the step of:

(i) printing indicia in accordance with said selected one of said plurality of programs for printing indicia using less than all of said nozzles.

14. The method as defined in claim 13, wherein said indicia comprise postage amounts.

15. The method as defined in claim 11, wherein said selected one of said plurality of programs for printing indicia using less than all of said nozzles is selected in dependence on which one of said second plurality of states said word has.

16. The method as defined in claim 9, further comprising the steps of:

(d) measuring the time interval from the time when the start of a printed line is photodetected to the time when the end of said printed line is detected; and (e) comparing said time interval to a window of time corresponding to the time required to scan a printed line formed by a number of dots equal to said predetermined number.

* * * * *